United States Patent  
Chang

(10) Patent No.: US 10,385,834 B2
(45) Date of Patent: Aug. 20, 2019

(54) DIAPHRAGM PUMP

(71) Applicant: TAIKO INVESTMENT CO., LTD., New Taipei, Taiwan (CN)

(72) Inventor: Pohan Chang, New Taipei (CN)

(73) Assignee: TAIKO INVESTMENT CO., LTD., New Taipei, Taiwan (CN)

( * ) Notice: Subject to any disclaimer, the term of this patent is extended or adjusted under 35 U.S.C. 154(b) by 85 days.

(21) Appl. No.: 15/641,857

(22) Filed: Jul. 5, 2017

(65) Prior Publication Data

US 2018/0320683 A1 Nov. 8, 2018

(30) Foreign Application Priority Data

May 5, 2017 (CN) .................... 2017 2 0497206 U

(51) Int. Cl.
*F04B 9/02* (2006.01)
*F04B 43/04* (2006.01)
(Continued)

(52) U.S. Cl.
CPC ............... *F04B 9/02* (2013.01); *F04B 17/03* (2013.01); *F04B 43/04* (2013.01); *F04B 45/047* (2013.01);
(Continued)

(58) Field of Classification Search
CPC .... F04B 17/03; F04B 9/02; F04B 9/04; F04B 9/045; F04B 43/025; F04B 43/026; F04B 43/04; F04B 43/0081; F04B 45/04–45/0536; F04B 43/02–43/0736; F04B 2201/1208; F04B 49/20; F04B 49/06; F04B 2203/0209; G01J 1/0266; G01J 5/089; G01B 11/00–11/306; G01B 11/27; G01B 11/272; G01B 2210/28; G01B 2210/283; G01B 11/26; G01P 3/00; G01P 3/36; G01P 3/68; G01D 5/344; G01D 5/345; G01D 5/347–5/34792; G01D 5/3473; G01D 5/34738; G01N 21/21–21/23; G01C 19/64; G01C 19/66; G01C 19/72

See application file for complete search history.

(56) References Cited

U.S. PATENT DOCUMENTS

| 5,593,287 A * | 1/1997 | Sadakata | ................ F02M 37/08 |
| | | | 123/509 |
| 2002/0122730 A1 * | 9/2002 | Dexter | .................... B08B 3/026 |
| | | | 417/299 |
| 2018/0023556 A1 * | 1/2018 | Yan | ......................... F04B 9/045 |
| | | | 417/42 |

\* cited by examiner

*Primary Examiner* — Bryan M Lettman
(74) *Attorney, Agent, or Firm* — David D. Brush; Westman, Champlin & Koehler, P.A.

(57) ABSTRACT

A diaphragm pump includes a driving assembly, a pump body, a connecting rod assembly, a photoelectric shielding sheet, and a photoelectric sensor. The driving assembly includes a base seat and an electric motor provided to the base seat. The pump body is connected to the base seat to define a chamber. The connecting rod assembly is disposed in the chamber and includes an eccentric wheel connected with an electric motor shaft of the electric motor. The photoelectric shielding sheet is separately provided to the eccentric wheel and rotates synchronously with the eccentric wheel and the electric motor shaft. The photoelectric sensor is provided to the base seat and cooperates with the photoelectric shielding sheet to detect a rotational speed of the electric motor shaft and send a signal to a motor controller. The motor controller adjusts the rotational speed of the electric motor shaft according to the signal.

8 Claims, 3 Drawing Sheets

(51) Int. Cl.
*G01P 3/36* (2006.01)
*F04B 45/047* (2006.01)
*F04B 17/03* (2006.01)
*G01B 11/00* (2006.01)
*F04B 49/20* (2006.01)
*F04B 49/06* (2006.01)

(52) U.S. Cl.
CPC .............. *F04B 49/06* (2013.01); *F04B 49/20* (2013.01); *G01P 3/36* (2013.01); *F04B 2203/0209* (2013.01); *G01B 11/00* (2013.01)

DIAPHRAGM PUMP

This Application claims priority to and the benefit of Chinese Patent Application No. 201720497206.9, filed May 5, 2017, the content of which is incorporated herein by reference in its entirety.

FIELD

The present disclosure relates to a technical field of pumps, and more particularly to a diaphragm pump.

BACKGROUND

In the related art, a diaphragm pump is provided with a photoelectric sensor for detecting a rotational speed of an electric motor shaft and a photoelectric shielding sheet, in which, the photoelectric shielding sheet is integrally formed on an eccentric wheel or the electric motor shaft. This configuration makes structures of the eccentric wheel and the electric motor shaft excessively complicated, being not easy to process and manufacture, and during a process of high-speed rotation, as being unevenly stressed, a resulting fluttering phenomenon will occur to the eccentric wheel.

SUMMARY

Embodiments of the present disclosure seek to solve at least one of the problems existing in the related art to at least some extent.

For that reason, a diaphragm pump is provided by the present disclosure, and the diaphragm pump has low production cost, stable operation and low noise.

The diaphragm pump according to embodiments of the present disclosure includes a driving assembly including a base seat and an electric motor provided to the base seat; a pump body connected to the base seat so as to define a chamber; a connecting rod assembly disposed in the chamber and including an eccentric wheel connected with an electric motor shaft of the electric motor; a photoelectric shielding sheet separately provided to the eccentric wheel and configured to rotate synchronously with the eccentric wheel and the electric motor shaft; and a photoelectric sensor provided to the base seat and cooperating with the photoelectric shielding sheet so as to detect a rotational speed of the electric motor shaft and send a detected signal to an electric motor controller, the electric motor controller is configured to adjust the rotational speed of the electric motor shaft of the electric motor according to the detected signal.

In the diaphragm pump according to embodiments of the present disclosure, by separately providing the photoelectric shielding sheet to the eccentric wheel, the stability of the eccentric wheel during a rotating process is improved, and the working noise and production cost of the diaphragm pump is reduced.

In addition, the diaphragm pump according to embodiments of the present disclosure may further include the following additional technical features.

According to an embodiment of the present disclosure, the photoelectric shielding sheet is detachably disposed to the eccentric wheel.

According to an embodiment of the present disclosure, the photoelectric shielding sheet extends outwards along a radial direction of the eccentric wheel.

According to an embodiment of the present disclosure, the eccentric wheel is provided with a first connecting member, the photoelectric shielding sheet is provided with a second connecting member, and the first connecting member and the second connecting member are fitted with each other so that the photoelectric shielding sheet is connected to the eccentric wheel.

According to an embodiment of the present disclosure, the first connecting member is configured as a positioning hole, and the second connecting member is configured as a positioning pillar.

According to an embodiment of the present disclosure, the photoelectric shielding sheet includes a positioning portion provided closely to an upper surface of the eccentric wheel and a shielding portion connected to the positioning portion and extending radially outwards.

According to an embodiment of the present disclosure, the diaphragm pump further includes a counterweight member mounted to the photoelectric shielding sheet.

According to an embodiment of the present disclosure, the counterweight member is configured as a screw, and the photoelectric shielding sheet is provided with a threaded hole fitted with the screw.

According to an embodiment of the present disclosure, the diaphragm pump further includes a printed circuit board provided to the base seat and connected with the photoelectric sensor; the printed circuit board is provided with a lead wire connector, and a lead wire is electrically connected to the printed circuit board through the lead wire connector; one of the lead wire and the lead wire connector is provided with a lead wire plug, the other one of the lead wire and the lead wire connector is provided with a lead wire jack, and the lead wire plug is plugged into the lead wire jack.

According to an embodiment of the present disclosure, the lead wire connector is provided with the lead wire jack, the lead wire is provided with the lead wire plug, and the lead wire is plugged in the lead wire jack through the lead wire plug.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
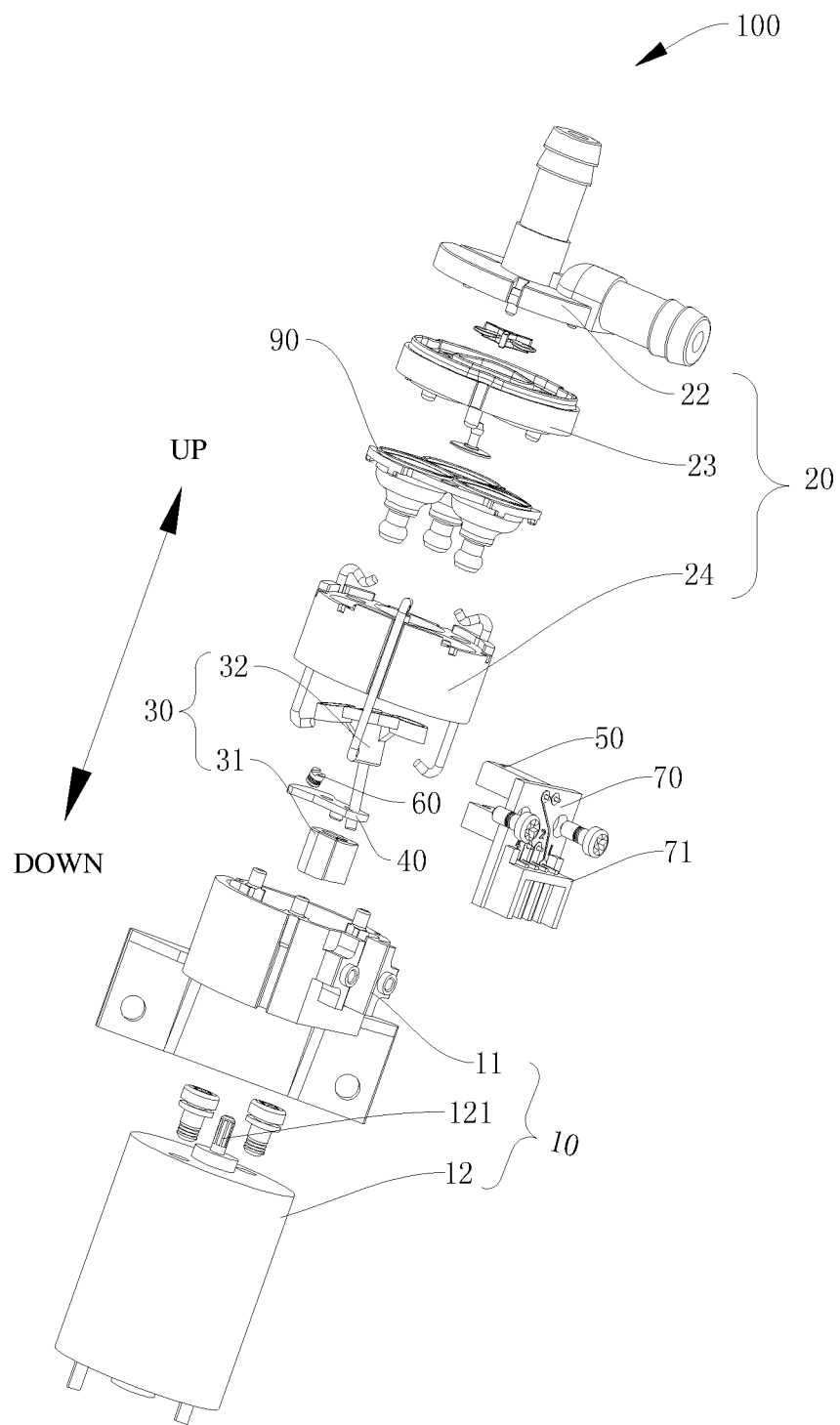
FIG. 1 is an exploded view of a diaphragm pump according to an embodiment of the present disclosure.

Diaphragm pump 100;
Driving assembly 10; base seat 11; electric motor 12; electric motor shaft 121;

Pump body 20; chamber 21; upper cover 22; valve seat 23; cylinder body 24;

Connecting rod assembly 30; eccentric wheel 31; first connecting member 311; eccentric hole 312; connecting rod 32;

Photoelectric shielding sheet 40; second connecting member 41; threaded hole 42;

Photoelectric sensor 50;

Counterweight member 60;

Printed circuit board 70; lead wire connector 71; lead wire jack 711;

Lead wire 80; lead wire plug 81;

Piston assembly 90.

DETAILED DESCRIPTION

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A diaphragm pump 100 according to embodiments of the present disclosure will be described with reference to FIGS. 1-5 in detail in the following. The diaphragm pump 100 may be applied in a coffee machine or a juicer, and water is pumped to the coffee machine or the juicer through the diaphragm pump 100. The diaphragm pump 100 may also be applied in a sphygmomanometer, a car seat or a massage chair, and the sphygmomanometer, the car seat or the massage chair may be inflated or deflated through the diaphragm pump 100. It could be understood that, the above description is just illustrative, and is not a limit to the protection scope of the present disclosure. The diaphragm pump 100 according to embodiments of the present disclosure may be widely applied in technical fields of medical equipment and household appliances.

The diaphragm pump 100 according to embodiments of the present disclosure may generally include a pump body 20, a driving assembly 10, a photoelectric shielding sheet 40 and a photoelectric sensor 50. The driving assembly 10 may include a base seat 11 and an electric motor 12 provided to the base seat 11.

Figure 2:
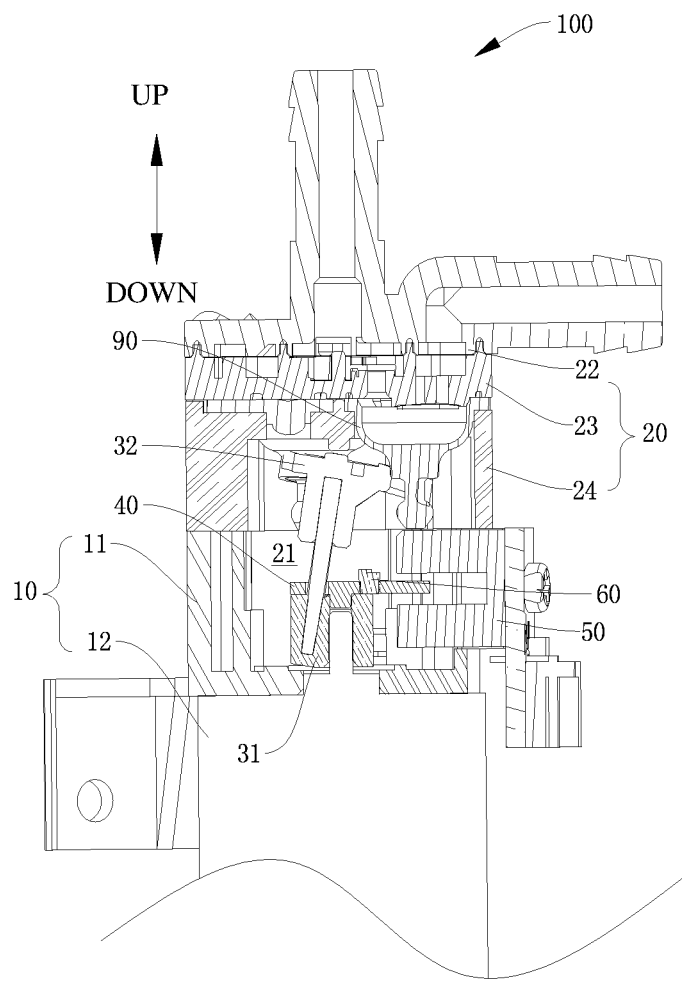
FIG. 2 is a partially sectional view of a diaphragm pump according to an embodiment of the present disclosure.
Figure 3:
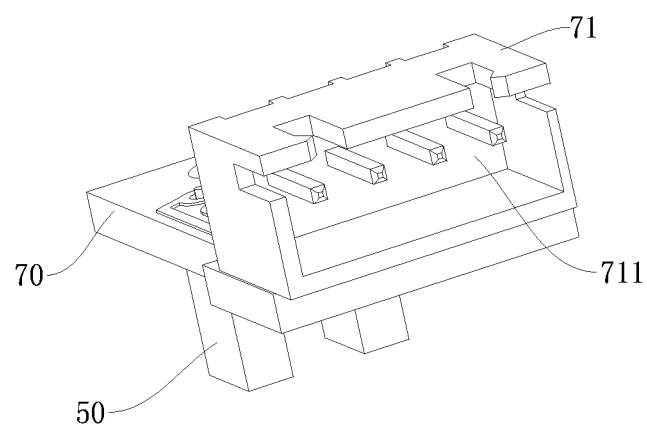
FIG. 3 is an assembly view of a photoelectric sensor, a printed circuit board and a lead wire connector according to an embodiment of the present disclosure.
Figure 4:
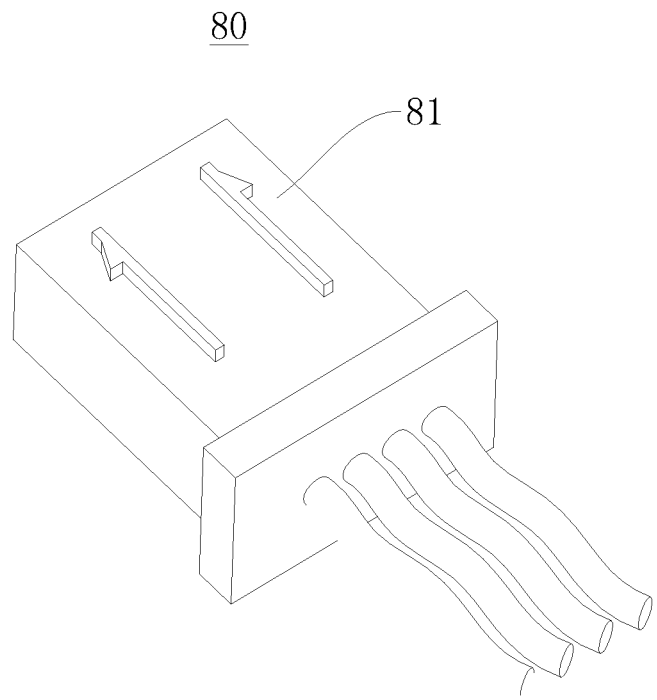
FIG. 4 is a perspective view of a lead wire according to an embodiment of the present disclosure.
Figure 5:
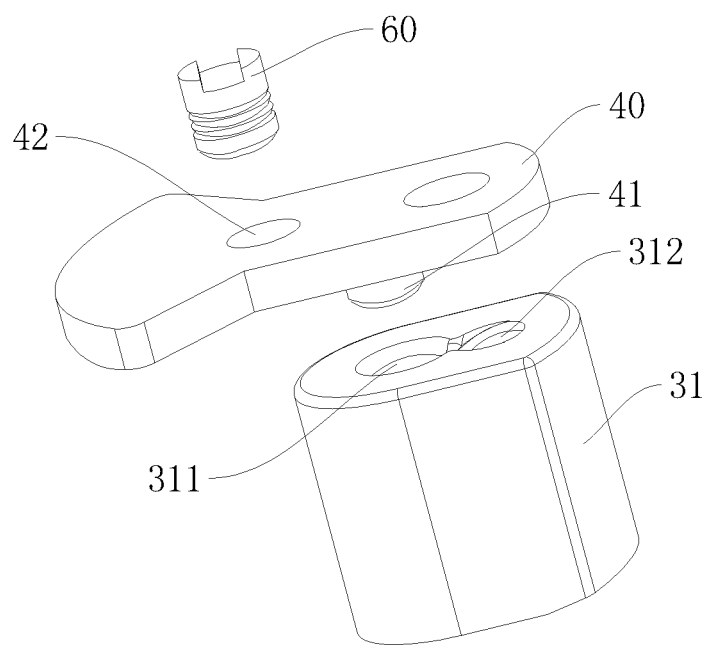
FIG. 5 is a perspective view illustrating an eccentric wheel, a photoelectric shielding sheet and a counterweight member according to an embodiment of the present disclosure.

Specifically, as shown in FIG. 1 and FIG. 2, the pump body 20 may include an upper cover 22, a valve seat 23 and a cylinder body 24 which are connected in sequence. The upper cover 22 is provided with a water inlet pipe having a water inlet and a water outlet pipe having a water outlet. A bottom portion of the upper cover 22 is recessed upwards to define a first groove, and the first groove is divided into an upper-outer groove and an upper-inner groove by an upper annular partition board. An upper surface of the valve seat 23 is recessed downwards to define a second groove corresponding to the first groove, and the second groove is divided into a lower-outer groove and a lower-inner groove by a lower annular partition board corresponding to the upper annular partition board. The upper cover 23 seals and is mounted to the valve seat 23, and is divided into a water inlet cavity at an outer side and a water outlet cavity at an inner side by the upper annular partition board and the lower annular partition board. The water inlet cavity is communicated with the water inlet, and the water outlet cavity is communicated with the water outlet.

The valve seat 23 is provided with a plurality of groups of upper water outlet holes and a plurality of groups of lower water inlet holes. An umbrella-shaped valve configured to open or close the lower water inlet holes is provided at a position, corresponding to each group of the lower water inlet holes, on a lower surface of the valve seat 23. A diaphragm assembly configured to open or close the upper water inlet holes is provided at a position, corresponding to each group of the upper water inlet holes, on the upper surface of the valve seat 23.

The cylinder body 24 is connected between the valve seat 23 and the base seat 11, and the cylinder body 24 is provided with a plurality of mounting holes. The piston assembly 90 for pumping a fluid is mounted to the cylinder body 24. The piston assembly 90 is provided with a plurality of capsule bodies and a panel for connecting the plurality of capsule bodies. Each capsule body falls into the mounting hole. Each capsule body includes a capsule cavity and a mounting pillar, an upper end of the capsule cavity is open, the panel and a circumferential edge of the upper end of each capsule cavity are connected and formed integrally. A lower end of the capsule cavity is connected with an upper end of the mounting pillar. Each capsule cavity runs through the mounting hole and is closely provided to an upper surface of the cylinder body 24 by the panel. The valve seat 23 is pressed on the panel so that the piston assembly 90 is clamped between the valve seat 23 and the base seat 11.

A connecting rod assembly 30 is connected to an electric motor shaft 121 of an electric motor 12 and the mounting pillar, such that, during a rotating process of the electric motor 12, the capsule body is driven by the connecting rod assembly 30 to swing up and down, the capsule cavity is compressed and expanded, thus implementing a process of pumping the fluid.

The upper cover 22 and the valve seat 23 may be snap-fitted together, the valve seat 23 and the cylinder body 24 being f snap-fitted together as well as the cylinder body 24 and the base seat 11 being snap-fitted together, and then all of them may be connected into a whole by a plurality of clamps. The pump body 20 may be configured as a square frame or a cylindrical frame.

In some embodiments of the present disclosure, as shown in FIG. 2, the connecting rod assembly 30 is disposed in a chamber 21, the connecting rod assembly 30 includes: an eccentric wheel 31 and a connecting rod 32. The eccentric wheel 31 is provided with an inclined eccentric hole 312 in an axial direction of the eccentric wheel 31. The eccentric wheel 31 is connected with the electric motor shaft 121 of the electric motor 12.

The photoelectric shielding sheet 40 is separately provided to the eccentric wheel 31 or the electric motor shaft 121, and the photoelectric shielding sheet 40 is configured to rotate synchronously with the eccentric wheel 31 and the electric motor shaft 121. That is, the photoelectric shielding sheet 40 is a separate element with respect to the eccentric wheel 31 or the electric motor shaft 121. Thus, a manufacturing and producing process of the eccentric wheel 31 or the electric motor shaft 121 may be simplified and a fluttering phenomenon may be prevented from occurring to the eccentric wheel 31.

According to practical needs, the photoelectric shielding sheet 40 may be provided to an upper surface of the eccentric wheel 31, or may be provided to a lower surface of the electric motor shaft 121, or may be disposed between an upper surface of the electric motor shaft 121 and a lower surface of the eccentric wheel 31.

In an optional embodiment, the photoelectric shielding sheet 40 may be detachably disposed to the eccentric wheel 31, and the photoelectric shielding sheet 40 is configured to rotate synchronously with the eccentric wheel 31. The photoelectric shielding sheet 40 may be provided with an inclined hole corresponding to the eccentric hole 312 of the eccentric wheel 31. An end of a steel pin is inserted in the inclined hole and the eccentric hole 312, and the other end of the steel pin is connected to the connecting rod 32.

The photoelectric sensor 50 is provided to the base seat 11, and the photoelectric sensor 50 cooperates with the photoelectric shielding sheet 40 so as to detect a rotational speed of the electric motor shaft 121 and send a detected signal to an electric motor controller. The electric motor controller is configured to adjust the rotational speed of the electric motor shaft 121 of the electric motor 12 according to the detected signal.

As shown in FIG. 1 and FIG. 2, the photoelectric sensor 50 is disposed in the chamber 21, and the photoelectric sensor 50 is provided with a through groove throughout along a rotating piece of the photoelectric shielding sheet 40. The photoelectric shielding sheet 40 passes through the through groove when rotating to detect the rotational speed of the electric motor shaft 121 and send the detected signal to the electric motor controller, so that the electric motor controller precisely controls the rotational speed of the electric motor shaft 121.

In the diaphragm pump 100 according to embodiments of the present disclosure, by providing the photoelectric shielding sheet 40 separately to the eccentric wheel 31 or the electric motor shaft 121, the stability of the eccentric wheel 31 during a rotating process is improved, and the working noise and production cost of the diaphragm pump 100 is reduced.

In an optional embodiment, as shown in FIG. 2, the photoelectric shielding sheet 40 extends outwards along a radial direction of the eccentric wheel 31. The photoelectric sensor 50 is provided to an inner wall face of the base seat 11, and an opening of the through groove faces an inner side. Thus, during the rotating process of the eccentric wheel 31, the photoelectric shielding sheet 40 may extend into the through groove to play a role of shielding light.

In some embodiments of the present disclosure, the eccentric wheel 31 is provided with a first connecting member 311, the photoelectric shielding sheet 40 is provided with a second connecting member 41, and the first connecting member 311 and the second connecting member 41 are fitted with each other so that the photoelectric shielding sheet 40 is connected to the eccentric wheel 31. Specifically, the first connecting member 311 is configured as a positioning hole, and the second connecting member 41 is configured as a positioning pillar. Thus, the stability of the fitting between the photoelectric shielding sheet 40 and the eccentric wheel 31 may be improved effectively and the assembly efficiency of the photoelectric shielding sheet 40 and the eccentric wheel 31 may be improved.

In an optional embodiment, as shown in FIG. 1 and FIG. 2, the photoelectric shielding sheet 40 includes a positioning portion and a shielding portion. The positioning portion is provided closely to the upper surface of the eccentric wheel 31, and the shielding portion is connected to the positioning portion and extends radially outwards. The shielding portion is configured as a fan shape. Thus, a light ray may be effectively shielded by the shielding portion in the through groove of the photoelectric sensor 50, so that the photoelectric sensor 50 may detect the rotational speed of the electric motor shaft 121 accurately.

In some other embodiments of the present disclosure, the diaphragm pump 100 further includes a counterweight member 60. As shown in FIG. 2, in combination with FIG. 5, the counterweight member 60 is mounted to the photoelectric shielding sheet 40. Thus, by providing the counterweight member 60 to the photoelectric shielding sheet 40, the stability of the eccentric wheel 31 during the rotating process is further improved, and the working noise of the diaphragm pump 100 is reduced.

In a further optional embodiment, the counterweight member 60 is configured as a screw, and the photoelectric shielding sheet 40 is provided with a threaded hole 42 fitted with the screw. Thus, the counterweight member 60 is easy to be assembled to the photoelectric shielding sheet 40. It could be understood that, the above embodiments are just illustrative and are not a limit to protection scope of the present disclosure. For example, the counterweight member 60 may be configured as a steel ball.

In some further embodiments of the present disclosure, the diaphragm pump 100 further includes a printed circuit board 70. The printed circuit board 70 is provided to the base seat 11 and connected with the photoelectric sensor 50. The printed circuit board 70 is provided with a lead wire connector 71, and a lead wire 80 is electrically connected to the printed circuit board 70 through the lead wire connector 71. One of the lead wire 80 and the lead wire connector 71 is provided with a lead wire plug 81, the other one of the lead wire 80 and the lead wire connector 71 is provided with a lead wire jack 711, and the lead wire plug 81 is plugged into the lead wire jack 711.

The lead wire plug 81 may be provided to the lead wire 80. At the same time, the lead wire jack 711 is provided to the lead wire connector 71. By plugging the lead wire plug 81 of the lead wire in the lead wire jack 711 of the lead wire connector 71 to complete the connection between the lead wire 80 and the lead wire connector 71, the electrical connection between the lead wire 80 and the printed circuit board 70 may be implemented, so that the lead wire 80 may transmit electric currents and signals to the photoelectric sensor 50, and the normal operation of the diaphragm pump 100 may be ensured. When the lead wire 80 needs to be dismounted due to maintenance or other reasons, the lead wire 80 may be removed from the lead wire connector 71 directly. Thus, by providing the lead wire connector 71 to the printed circuit board 70, the connection and disassembly between the lead wire 80 and the printed circuit board 70 may be convenient and the cost is low.

Certainly, the lead wire plug may be provided to lead wire connector, and at the time the lead wire jack is provided to the lead wire. By plugging the lead wire plug of the lead wire connector in the lead wire jack of the lead wire, it is also convenient for the connection and disassembly between the lead wire and the printed circuit board, and the cost of the diaphragm pump 100 is low.

For the diaphragm pump 100 according to embodiments of the present disclosure, precise control over a flow rate of the diaphragm pump may be achieved; and by plugging the lead wire plug 81 provided to one of the lead wire 80 and the lead wire connector 71 into the lead wire jack 7111 provided in the other one of the lead wire 80 and the lead wire connector 71, it is convenient for the connection and disassembly between the lead wire 80 and the printed circuit board 70, and the cost is low.

In the specification, it is to be understood that terms such as "upper," "lower," "bottom," "inner," "outer," should be construed to refer to the orientation as then described or as shown in the drawings under discussion. These relative terms are for convenience of description and do not require that the present invention be constructed or operated in a particular orientation, thus these relative terms should not be construed as a limit to the present disclosure.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A diaphragm pump comprising:
    a driving assembly comprising a base seat and an electric motor provided to the base seat;
    a pump body connected to the base seat so as to define a chamber;
    a connecting rod assembly disposed in the chamber and comprising an eccentric wheel connected with an electric motor shaft of the electric motor;
    a photoelectric shielding sheet separately provided to the eccentric wheel and configured to rotate synchronously with the eccentric wheel and the electric motor shaft; and
    a photoelectric sensor provided to the base seat and cooperating with the photoelectric shielding sheet so as to detect a rotational speed of the electric motor shaft and send a detected signal to an electric motor controller, the electric motor controller being configured to adjust the rotational speed of the electric motor shaft of the electric motor according to the detected signal,
    wherein the eccentric wheel is provided with a first connecting member, the photoelectric shielding sheet is provided with a second connecting member, and the first connecting member and the second connecting member are fitted with each other so that the photoelectric shielding sheet is connected to the eccentric wheel,
    wherein the first connecting member is configured as a positioning hole and the second connecting member is configured as a positioning pillar.

2. The diaphragm pump according to claim 1, wherein the photoelectric shielding sheet is detachably disposed to the eccentric wheel.

3. The diaphragm pump according to claim 2, wherein the photoelectric shielding sheet extends outwards along a radial direction of the eccentric wheel.

4. The diaphragm pump according to claim 3, wherein the photoelectric shielding sheet comprises:
    a positioning portion provided closely to an upper surface of the eccentric wheel; and
    a shielding portion connected to the positioning portion and extending radially outwards.

5. The diaphragm pump according to claim 4, wherein the shielding portion is configured as a fan shape.

6. The diaphragm pump according to claim 1, further comprising a printed circuit board wherein the printed circuit board is provided to the base seat and connected with the photoelectric sensor; the printed circuit board is provided with a lead wire connector, and a lead wire is electrically connected to the printed circuit board through the lead wire connector; one of the lead wire and the lead wire connector is provided with a lead wire plug, the other one of the lead wire and the lead wire connector is provided with a lead wire jack, and the lead wire plug is plugged into the lead wire jack.

7. The diaphragm pump according to claim 6, wherein the lead wire connector is provided with the lead wire jack, the lead wire is provided with the lead wire plug, and the lead wire is plugged in the lead wire jack through the lead wire plug.

8. A diaphragm pump comprising:
    a driving assembly comprising a base seat and an electric motor provided to the base seat;
    a pump body connected to the base seat so as to define a chamber;
    a connecting rod assembly disposed in the chamber and comprising an eccentric wheel connected with an electric motor shaft of the electric motor;
    a photoelectric shielding sheet separately provided to the eccentric wheel and configured to rotate synchronously with the eccentric wheel and the electric motor shaft;
    a photoelectric sensor provided to the base seat and cooperating with the photoelectric shielding sheet so as to detect a rotational speed of the electric motor shaft and send a detected signal to an electric motor controller, the electric motor controller being configured to adjust the rotational speed of the electric motor shaft of the electric motor according to the detected signal; and
    a counterweight member mounted to the photoelectric shielding,
    wherein the counterweight member is configured as a screw, and the photoelectric shielding sheet is provided with a threaded hole fitted with the screw.

* * * * *